(12) United States Patent
Tanaka et al.

(10) Patent No.: US 7,920,241 B2
(45) Date of Patent: Apr. 5, 2011

(54) LIQUID CRYSTAL DISPLAY DEVICE AND DISPLAY APPARATUS

(75) Inventors: Hironao Tanaka, Kanagawa (JP); Koji Noguchi, Kanagawa (JP); Yasuhiro Kanaya, Tokyo (JP); Daiki Nakajima, Kanagawa (JP); Daisuke Nozu, Kanagawa (JP); Masumitsu Ino, Kanagawa (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 12/036,744

(22) Filed: Feb. 25, 2008

(65) Prior Publication Data

US 2008/0204648 A1 Aug. 28, 2008

(30) Foreign Application Priority Data

Feb. 27, 2007 (JP) .................. 2007-046534

(51) Int. Cl.
*G02F 1/1343* (2006.01)
(52) U.S. Cl. .................. 349/141; 349/139; 349/138
(58) Field of Classification Search .................. 349/141, 349/139, 143, 138, 43
See application file for complete search history.

(56) References Cited

U.S. PATENT DOCUMENTS

| | | | | |
|---|---|---|---|---|
| 6,100,954 A * | 8/2000 | Kim et al. | ...................... | 349/138 |
| 6,233,034 B1 * | 5/2001 | Lee et al. | ...................... | 349/141 |
| 6,784,956 B2 * | 8/2004 | Matsumoto et al. | .......... | 349/110 |
| 7,477,347 B2 * | 1/2009 | Matsushima et al. | ......... | 349/114 |
| 7,561,239 B2 * | 7/2009 | Fujita | ............................. | 349/142 |
| 2007/0188685 A1 * | 8/2007 | Matsushima | ................. | 349/117 |

FOREIGN PATENT DOCUMENTS

| | | |
|---|---|---|
| JP | 2001-235765 | 8/2001 |
| JP | 3472837 | 9/2003 |
| JP | 3740514 | 11/2005 |
| JP | 3742836 | 11/2005 |
| JP | 2006-227661 | 8/2006 |
| JP | 2006-317516 | 11/2006 |
| JP | 2007-018015 | 1/2007 |

OTHER PUBLICATIONS

Japanese Office Action issued on Apr. 21, 2009 corresponding to JP Application No. 2007-046534.

* cited by examiner

*Primary Examiner* — Thoi V Duong
(74) *Attorney, Agent, or Firm* — SNR Denton US LLP

(57) ABSTRACT

There is provided a liquid crystal display device that includes a liquid crystal layer interposed between a first substrate and a second substrate and has on a first substrate side a common electrode and a pixel electrode for applying an electric field to the liquid crystal layer, the liquid crystal display device including: a plurality of scan lines and a plurality of signal lines; a drive element; a first insulating film; a common electrode; a second insulating film; and a pixel electrode, wherein the common electrode covers the pixel area except a formation area of the contact hole on the first insulating film and at least one of the scan line and the signal line.

8 Claims, 14 Drawing Sheets

$R_1 > R_2$

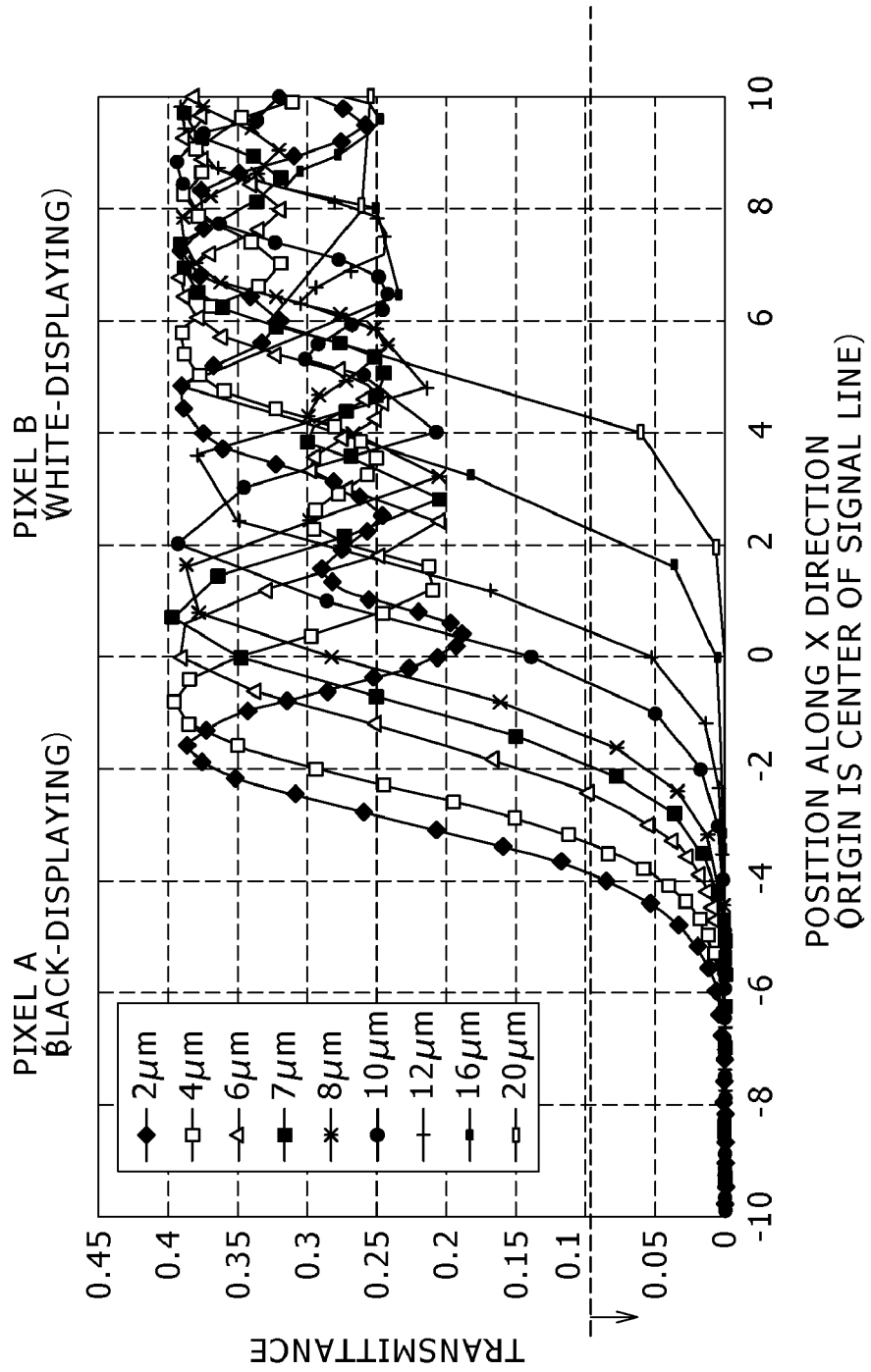

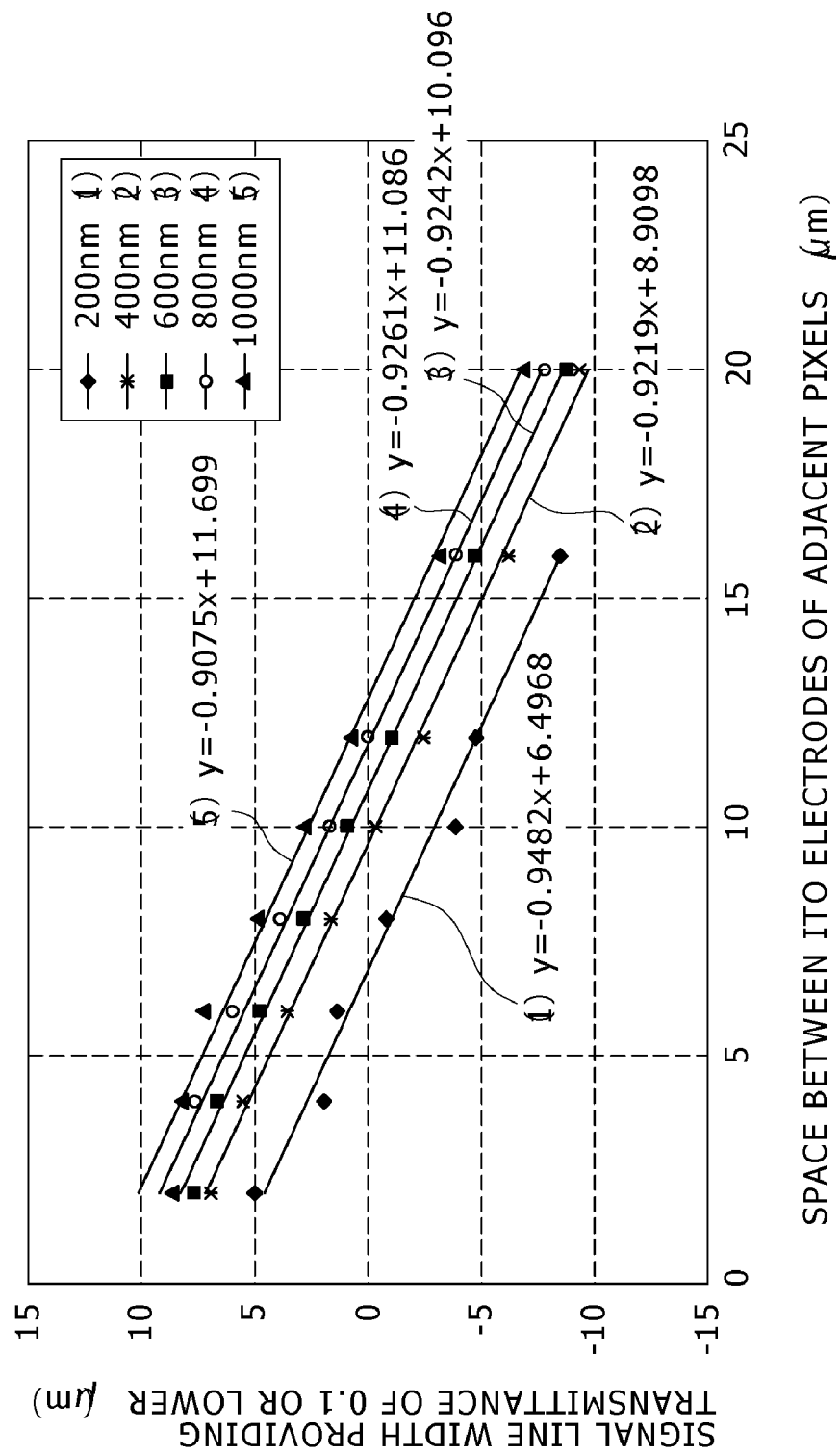

LIQUID CRYSTAL DISPLAY DEVICE AND DISPLAY APPARATUS

CROSS REFERENCES TO RELATED APPLICATIONS

The present invention contains subject matter related to Japanese Patent Application JP 2007-046534 filed in the Japan Patent Office on Feb. 27, 2007, the entire contents of which being incorporated herein by reference.

BACKGROUND OF THE INVENTION

1. Field of the Invention

The present invention relates to a liquid crystal display device and display apparatus, and particularly to a liquid crystal display device of a fringe field switching (FFS) mode (referred to also as an in-plane switching (IPS)-Pro mode) and display apparatus including the liquid crystal display device.

2. Description of the Related Art

In an FFS-mode liquid crystal display device, a common electrode and pixel electrodes for applying to a liquid crystal layer a lateral electric field substantially parallel to the substrate surface are provided on the same substrate side, and liquid crystal elements are driven by this lateral electric field for image displaying. An FFS-mode liquid crystal display device of a related art will be described below with reference to FIG. 14. The sectional view of FIG. 14A is along line A-A' in FIG. 14B.

The liquid crystal display device shown in this drawing is transmissive one. This liquid crystal display device includes a liquid crystal panel that is formed of a first substrate 110, a second substrate 120 disposed to face the element-formed surface of the first substrate 110, and a liquid crystal layer 130 interposed between these first and second substrates 110 and 120. Furthermore, in this liquid crystal panel, polarizers 140 and 150 are provided in tight contact with the outside surfaces of the first substrate 110 and the second substrate 120, respectively. Further outside the polarizer 140 on the first substrate 110, a backlight (not shown) serving as a light source for transmissive displaying is provided.

The first substrate 110 is formed of a transparent substrate such as a glass substrate. Over the surface thereof facing the liquid crystal layer 130, plural scan lines 111 and plural signal lines 112 are arranged in a matrix. At each of the intersections between the scan lines 111 and the signal lines 112, a drive element formed of a thin film transistor (TFT) 1 for driving a respective one of the pixels is provided. The area surrounded by the scan lines 111 and the signal lines 112 serves as a pixel area 110A.

Between the scan line 111 and the next scan line 111 for an adjacent pixel, a common potential line 113 is provided close to the scan line 111 for the adjacent pixel in parallel to the scan lines 111. Furthermore, on the same plane, a common electrode 114 is provided in the pixel area 110A except the formation area of the TFT 1 in such a way that one end of the common electrode 114 overlaps with the common potential line 113. This common electrode 114 is provided on the same plane as that of the scan line 111, and therefore the arrangement of the common electrode 114 is limited by the scan line 111.

A gate electrode 2 of the TFT 1 is formed of a partial portion of the scan line 111. On the first substrate 110, a gate insulating film 3 is provided to cover the scan line 111, the common potential line 113, and the common electrode 114. Moreover, a semiconductor layer 4 is pattern-formed on the gate insulating film 3 covering the gate electrode 2.

The partial portion of the semiconductor layer 4 directly above the gate electrode 2 serves as a channel layer 4a. On both the sides of the channel layer 4a, a source region 4b and a drain region 4c that contain an n-type impurity are provided. On the source region 4b, a source electrode 6a is so disposed as to be connected to the source region 4b, and the source electrode 6a is connected to the signal line 112. On the drain region 4c, a drain electrode 6b is so disposed as to be connected to the drain region 4c. The TFT 1 is formed in this manner.

On the gate insulating film 3, an interlayer insulating film 115 is provided to cover the TFT 1. In this interlayer insulating film 115, a contact hole 115a reaching the drain electrode 6b of the TFT 1 is provided. On the interlayer insulating film 115, a pixel electrode 116 that is connected via this contact hole 115a to the TFT 1 and has plural slits 116a is provided. These slits 116a are in parallel to the scan lines 111. Furthermore, an alignment layer 117 is provided on the interlayer insulating film 115 and covers the pixel electrode 116.

Due to this structure, an electric field is generated between the common electrode 114 and the ends of electrode portions of the pixel electrode 116, which sandwich the slits 116a. Thus, a lateral electric field substantially parallel to the substrate surface is applied to the liquid crystal layer 130.

The second substrate 120 is also formed of a transparent substrate such as a glass substrate. Over the surface thereof facing the liquid crystal layer 130, a color filter 121 for the respective colors of red (R), green (G), and blue (B) and an alignment layer 122 are provided in that order.

In the liquid crystal display device having the above-described structure, the scan line 111 and the common electrode 114 are disposed on the same plane of the first substrate 110, and therefore the formation area of the common electrode 114 is limited by the scan line 111. This leads to problems of a low aperture ratio and low transmittance.

To address the problems, there has been reported an example of a liquid crystal display device obtained by, in the structure of the liquid crystal display device described above by using FIG. 14, disposing the pixel electrode 116 having the slits 116a on the gate insulating film 3 and disposing the common electrode 114 on the interlayer insulating film 115 (refer to e.g. Japanese Patent No. 3742837 (Patent document 1)).

Furthermore, there has also been reported an example in which the common electrode 114 is disposed on the gate insulating film 3 in the structure of the liquid crystal display device described above by using FIG. 14 (refer to e.g. Japanese Patent No. 3740514 and Japanese Patent No. 3742836 (Patent documents 2 and 3)).

However, in the liquid crystal display device described in Patent document 1, although there is no limitation on the arrangement of the common electrode 114, it is difficult to apply an electric field parallel to the substrate surface because the pixel electrode 116 having the slits 116a is not disposed close to the liquid crystal layer 130. Thus, it is impossible to control the liquid crystal layer 130, and hence the liquid crystal displaying itself is difficult.

Furthermore, in the liquid crystal display device described in Patent documents 2 and 3, the arrangement of the common electrode 114 is limited by the signal line 112, and therefore it is difficult to keep a high aperture ratio.

To address these problems, it would be possible that, as shown in the plan view of FIG. 15A, a pixel electrode 116' that is so formed as to have a larger size on the signal line sides compared with the common electrode 114 is disposed to overlap with the signal lines 112. However, in this structure, as shown in the circuit diagram of FIG. 15B, parasitic capacitances C1 and C2 are generated between the signal line 112 and the pixel electrode 116', which causes vertical crosstalk.

SUMMARY OF THE INVENTION

There is a need for the present invention to provide a liquid crystal display device that is allowed to have an enhanced aperture ratio and suppressed parasitic capacitance, and display apparatus including the liquid crystal display device.

According to an embodiment of the present invention, there is provided a liquid crystal display device that includes a liquid crystal layer interposed between a first substrate and a second substrate and has on the first substrate side a common electrode and a pixel electrode for applying an electric field to the liquid crystal layer. The liquid crystal display device includes a plurality of scan lines and a plurality of signal lines configured to be disposed in a matrix over the first substrate, a drive element configured to be disposed at the intersection between the scan line and the signal line, and a first insulating film configured to be provided over the first substrate and cover the drive element. Furthermore, the liquid crystal display device includes a common electrode configured to be disposed on the first insulating film, a second insulating film configured to be disposed over the first insulating film and cover the common electrode, and a pixel electrode configured to be disposed on the second insulating film in a pixel area and have a plurality of slits. The pixel electrode is connected to the drive element via a contact hole provided in the second insulating film and the first insulating film. The common electrode covers the pixel area except the formation area of the contact hole on the first insulating film and at least one of the scan line and the signal line.

According to another embodiment of the present invention, there is provided display apparatus including a liquid crystal display device that includes a liquid crystal layer interposed between a first substrate and a second substrate and has on the first substrate side a common electrode and a pixel electrode for applying an electric field to the liquid crystal layer. The display apparatus displays video by using light modulated by the liquid crystal display device. The display apparatus includes a plurality of scan lines and a plurality of signal lines configured to be disposed in a matrix over the first substrate, a drive element configured to be disposed at the intersection between the scan line and the signal line, and a first insulating film configured to be provided over the first substrate and cover the drive element. Furthermore, the display apparatus includes a common electrode configured to be disposed on the first insulating film, a second insulating film configured to be disposed over the first insulating film and cover the common electrode, and a pixel electrode configured to be disposed on the second insulating film in a pixel area and have a plurality of slits. The pixel electrode is connected to the drive element via a contact hole provided in the second insulating film and the first insulating film. The common electrode covers the pixel area except the formation area of the contact hole on the first insulating film and at least one of the scan line and the signal line.

In such a liquid crystal display device and display apparatus, the common electrode is disposed on the first insulating film that covers the signal line and the scan line in such a manner as to cover not only the pixel area except the formation area of the contact hole but also at least one of the scan line and the signal line. This feature increases the effective pixel area and can enhance the aperture ratio. Furthermore, due to the provision of the common electrode covering at least one of the scan line and the signal line, parasitic capacitance between the scan line and the pixel electrode or between the signal line and the pixel electrode is suppressed.

As described above, according to the liquid crystal display device and the display apparatus of the embodiments of the present invention, the aperture ratio can be enhanced. Thus, the light transmittance is enhanced and contrast of the liquid crystal display device can be enhanced. Furthermore, because parasitic capacitance between the scan line and the pixel electrode or between the signal line and the pixel electrode is suppressed, signal noise in the pixels can be prevented. Thus, the held pixel potential is stabilized and neither vertical crosstalk nor horizontal crosstalk will occur, which can enhance the image quality of the liquid crystal display device.

Moreover, the liquid crystal display device according to the embodiment of the present invention and the display apparatus including it are free from generation of a back-channel in a semiconductor layer of the drive element formed of e.g. a transistor due to an electric field from the signal line, the scan line, and the pixel electrode. Thus, unstable operation due to a parasitic back-channel is prevented.

BRIEF DESCRIPTION OF THE DRAWINGS

FIG. 5 is a graph showing light leakage measured with changes of the distance between pixel electrodes of adjacent pixels, according to the embodiment of the present invention;

FIG. 6 is a graph showing the relationship between the signal line width and the film thickness of a second insulating film, associated with changes of the distance between pixel electrodes of adjacent pixels, according to the embodiment of the present invention;

DETAILED DESCRIPTION OF THE PREFERRED EMBODIMENTS

An embodiment of the present invention will be described in detail below.

First Embodiment

Figure 1A:
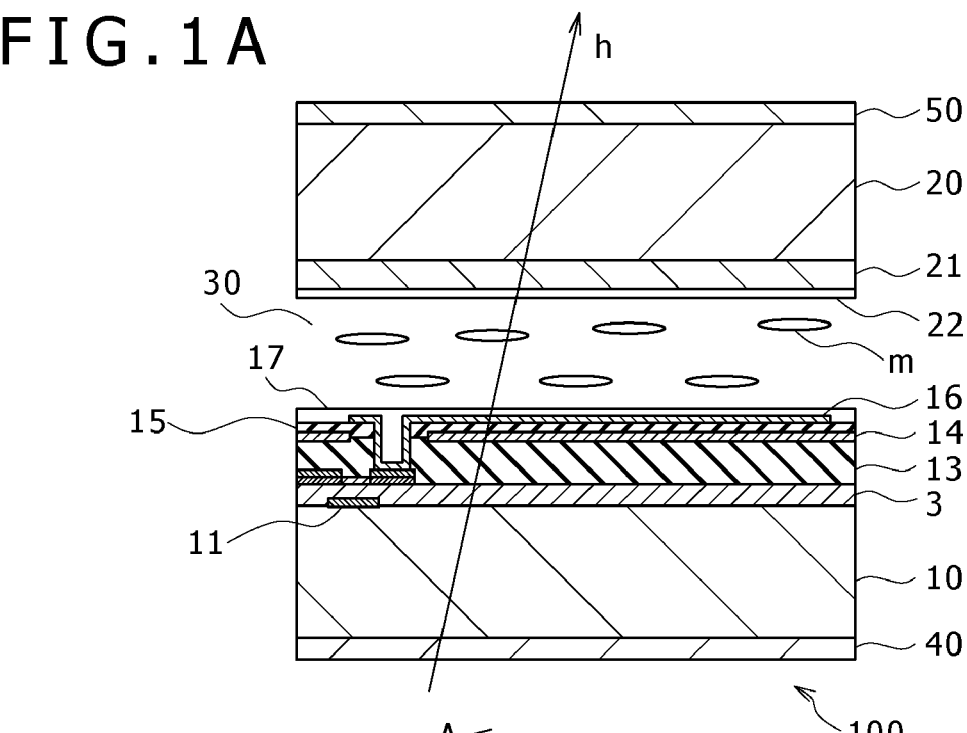
FIGS. 1A and 1B are a sectional view and a plan view, respectively, showing the structure of a liquid crystal display device according to an embodiment of the present invention.
Figure 1B:
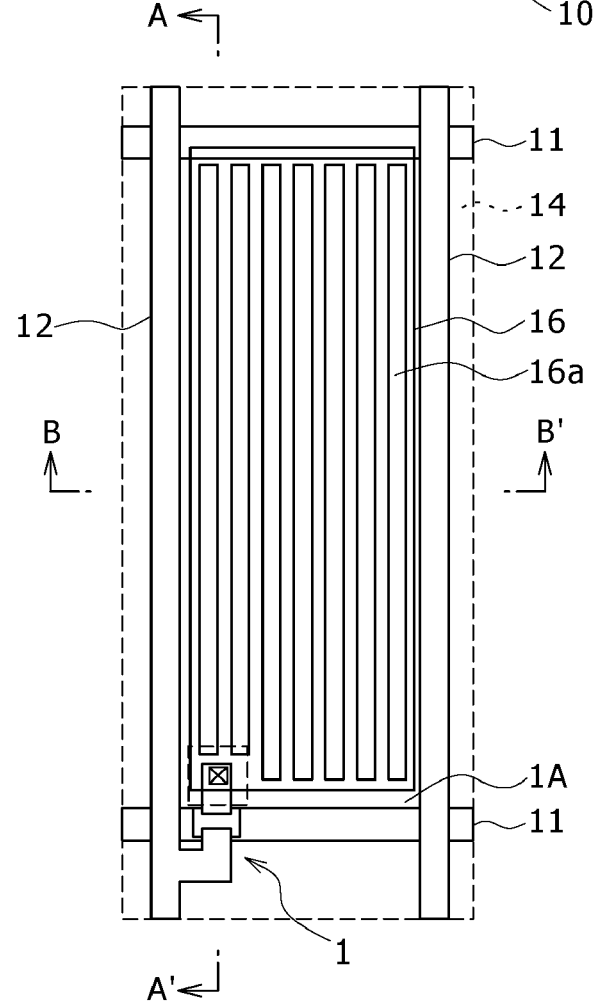

FIG. 1A is a sectional view of a transmissive liquid crystal display device of an FFS mode, and FIG. 1B is a plan view thereof. FIG. 1A is along line A-A' in FIG. 1B.

A liquid crystal display device 100 includes a liquid crystal panel that is formed of a first substrate 10, a second substrate 20 disposed to face the element-formed surface of the first substrate 10, and a liquid crystal layer 30 interposed between these first and second substrates 10 and 20. The liquid crystal layer 30 is composed of a nematic liquid crystal. In this liquid crystal panel, polarizers 40 and 50 are provided in tight contact with the outside surfaces of the first substrate 10 and the second substrate 20, respectively, with the intermediary of an adhesive (not shown). These polarizers 40 and 50 are provided in a crossed-Nicols state. Further outside the polarizer 40 on the first substrate 10, a backlight (not shown) serving as a light source for transmissive displaying is provided.

This structure is general one, except for the first substrate 10. For example, the second substrate 20, which is the displaying-side substrate, is formed of a transparent substrate such as a glass substrate. Over the surface thereof facing the liquid crystal layer 30, a color filter 21 for the respective colors of red (R), green (G), and blue (B) and an alignment layer 22 are provided in that order.

On the other hand, the first substrate 10 as the backside substrate has a characteristic structure, and hence the details thereof will be described below.

The first substrate 10 is formed of a transparent substrate such as a glass substrate. Over the surface thereof facing the liquid crystal layer 30, plural scan lines 11 and plural signal lines 12 are arranged in a matrix. As the material of the scan lines 11 and the signal lines 12, any of the following materials is used: aluminum (Al), molybdenum (Mo), chromium (Cr), tungsten (W), titanium (Ti), lead (Pb), a composite layer of any of these metals (e.g., Ti/Al), and a metal compound layer (MoSi, AlSi). In the present example, both the lines are composed of e.g. aluminum (Al). However, the scan lines 11 and the signal lines 12 may be composed of different materials.

At each of the intersections between the scan lines 11 and the signal lines 12, a drive element formed of a bottom-gate TFT 1 for driving a respective one of the pixels is provided. The area surrounded by the scan lines 11 and the signal lines 12 serves as a pixel area 1A. In the present example, this pixel area 1A has, in plan view, e.g. a rectangular shape that have longer sides extending along the signal lines 12 and shorter sides extending along the scan lines 11.

Figure 2A:
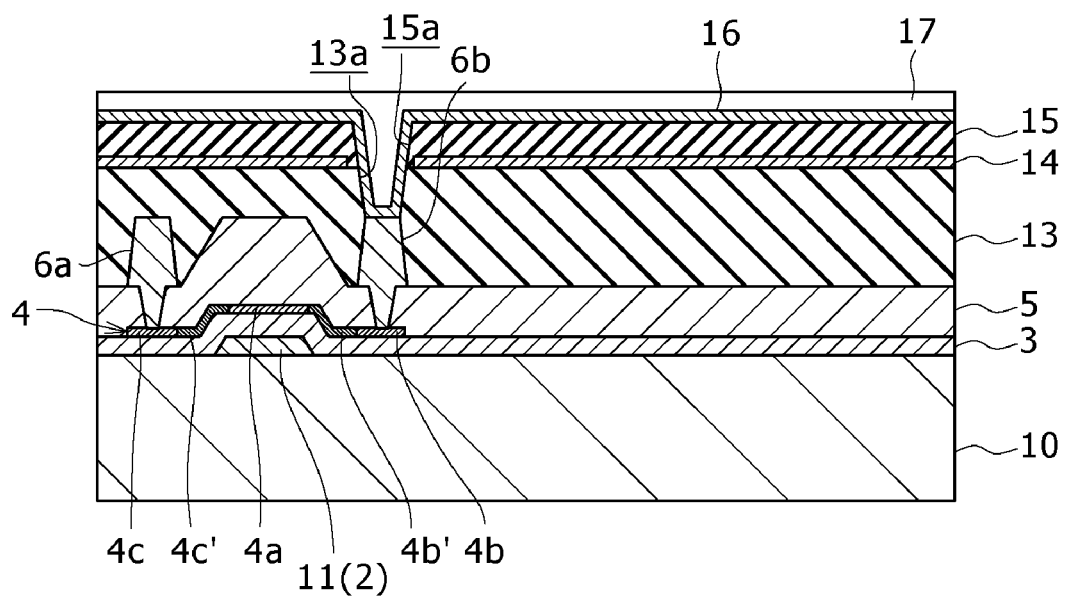
FIGS. 2A and 2B are enlarged sectional views along line A-A' in FIG. 1B, showing major part of a first substrate of the liquid crystal display device according to the embodiment of the present invention.

As shown in FIG. 2A, which is an enlarged sectional view of major part along line A-A', a gate electrode 2 of the TFT 1 is formed of a partial portion of the scan line 11. A gate insulating film 3 is formed on the first substrate 10 and covers the scan line 11 including the gate electrode 2. Furthermore, a semiconductor layer 4 is pattern-formed on the gate insulating film 3 covering the gate electrode 2.

The semiconductor layer 4 is composed of e.g. amorphous silicon (a-Si), polycrystalline silicon (poly-Si), or single-crystal silicon. The partial portion thereof directly above the gate electrode 2 serves as a channel layer 4a. On both the sides of the channel layer 4a, a source region 4b and a drain region 4c that contain e.g. an n-type impurity are provided. In addition, between the channel layer 4a and the source and drain regions 4b and 4c, LDD regions 4b' and 4c' having impurity concentration lower than that of the source and drain regions 4b and 4c are provided.

On the gate insulating film 3, an insulating layer 5 is provided to cover the semiconductor layer 4. A source electrode 6a and a drain electrode 6b are connected to the source and drain regions 4b and 4c via contact holes that are so provided in the insulating layer 5 as to reach the source and drain regions 4b and 4c. The source electrode 6a is formed of the same layer as that of the signal line 12.

On the insulating layer 5, a first insulating film 13 is provided to cover the source and drain electrodes 6a and 6b. In a later step, a second insulating film will be deposited over the first insulating film 13 at a high temperature of about 200° C. to 400° C. Therefore, it is preferable for the first insulating film 13 to have heat resistance. In addition, it is preferable for the first insulating film 13 to have high planarity because a common electrode will be formed thereon. Furthermore, it is preferable for the first insulating film 13 to have high transmittance, low film stress, and a low relative dielectric constant for suppressed parasitic capacitance. As the first insulating film 13 having such a characteristic, e.g. a spin-on-glass (SOG) film is particularly preferably used. The film thickness of the first insulating film 13 has great influence on the load capacitances of the scan line 11, the signal line 12, and the common electrode that will be formed on the first insulating film 13 in a later step: a larger thickness provides lower load capacitance. Therefore, it is preferable that the first insulating film 13 have a film thickness in the range of e.g. about 0.5 μm to 4.0 μm within the allowable range relating to the drive characteristics of the liquid crystal display device.

Instead of the SOG film, an inorganic insulating film such as a silicon oxide ($SiO_2$) or silicon nitride (SiN) film deposited by chemical vapor deposition (CVD) may be used as the first insulating film 13. Alternatively, an organic insulating film may be used. However, it is more preferable to use an organic insulating film as the first insulating film 13 than to use an inorganic insulating film deposited by CVD, because the organic insulating film has higher planarity and a lower relative dielectric constant and can be easily deposited by a coating method. For the organic insulating film, non-photosensitive resin or photosensitive resin is used. Examples of the non-photosensitive resin include acrylic resin, polyester, vinyl chloride, polycarbonate, polypropylene, polyethylene, triacetate, and polyimide. Examples of the photosensitive resin include acrylic resin, polyimide, and Sumiresin Excel CRC-8300 produced by Sumitomo Bakelite Co., Ltd. Properties of materials of the organic insulating film are shown in Table 1.

TABLE 1

|  | Polyester PET | Vinyl chloride PVC | Polycarbonate PC | Polypropylene PP | Polyethylene PE |
|---|---|---|---|---|---|
| Thickness (μm) | 25 | 25 | 25 | 25 | 25 |
| Density (g/cm$^2$) | 1.40 | 1.40 | 1.20 | 0.91 | 0.92 |
| Tensile strength (Mpa) | 176 | 98 | 98 | 186 | 20 |
| Elongation (%) | 120 | 50 | 140 | 110 | 400 |
| Edge tear resistance (Kg) | 23 | 8 | 10 | 15 | 2 |
| Moisture permeability (g/m$^{22}$ · 24 hr) | 21 | 35 | 60 | 8 | 20 |
| Oxygen permeability (cc/m$^2$ · hr · atm) | 3 | 6 | 300 | 100 | 250 |
| Water absorption (%) | 0.3 | 0.05 | 0.2 | 0.01 | 0.02 |
| Thermal expansion coefficient (ppm/° C.) | 90 | 118 | 70 | 110 | 170 |
| Humidity expansion coefficient (ppm/% RH) | — | — | — | — | — |
| Breakdown voltage (KV/mm) | 130 | 80 | 1200 | 120 | 80 |
| Volume resistivity (Ω · cm) | 1.0E+17 | 1.0E+15 | 1.0E+17 | 1.0E+16 | 1.0E+17 |
| Dielectric constant | 3.2 | 3.0 | 3.0 | 2.1 | 2.3 |
| Dielectric loss tangent | 0.002 | 0.01 | 0.002 | 0.003 | 0.0005 |
| Melting point (° C.) | 258 | 180 | 240 | 170 | 135 |
| Britleness temperature | −70 | −45 | −100 | −40 | −60 |
| Usable temperature | −70~150 | −20~80 | −100~130 | −50~120 | −50~75 |

|  | Triacetate TAC | Polyimide 1 *1 | Polyimide 2 *2 | Polyimide 3 *3 | CRC-8300 Sumitomo Bakelite |
|---|---|---|---|---|---|
| Thickness (μm) | 25 | 25 | 25 | 12 | 12 |
| Density (g/cm$^2$) | 1.30 | 1.43 | — | — | — |
| Tensile strength (Mpa) | 118 | 274 | 140~350 | 120 | 120 |
| Elongation (%) | 30 | 9 | 57~150 | 42 | 65 |
| Edge tear resistance (Kg) | 3 | 17 | — | — | — |
| Moisture permeability (g/m$^{22}$ · 24 hr) | 700 | 4 | — | 150 | 300 |
| Oxygen permeability (cc/m$^2$ · hr · atm) | 110 | 9.3 | — | — | — |
| Water absorption (%) | 4.4 | 1.3 | 1.0~2.9 | 1.9 | 0.3 |
| Thermal expansion coefficient (ppm/° C.) | — | 54 | 16~60 | 43 | 47 |
| Humidity expansion coefficient (ppm/% RH) | — | — | 16~24 | — | — |
| Breakdown voltage (KV/mm) | 60 | 140 | 60~400 | 260 | 260 |
| Volume resistivity (Ω · cm) | 1.0E+15 | 1.0E+17 | 1.0E+15 | 3.5E+16 | 1.0E+16 |
| Dielectric constant | 3.5 | 3.3 | — | 3.5 | 2.9 |
| Dielectric loss tangent | 0.02 | 0.001 | — | — | — |
| Melting point (° C.) | 290 | — | — | — | — |
| Britleness temperature | — | — | — | — | — |
| Usable temperature | ~120 | — | — | — | — |

*1 Non-photosensitive, PI (Literature)
*2 Non-photosensitive, Du Pont-Toray
*3 Non-photosensitive, Sumitomo Bakelite As a feature of the present embodiment, a common electrode 14 is so provided on the first insulating film 13 as to cover the pixel area 1A except the formation area of a contact hole for connecting a pixel electrode to be described later and the TFT 1, and at least one of the scan line 11 and the signal line 12. Due to this feature, corresponding to the covering of at least one of the scan line 11 and the signal line 12 by the common electrode 14, the effective pixel area can be increased and the aperture ratio can be enhanced. This common electrode 14 is formed of e.g. a transparent electrode film such as an indium tin oxide (ITO) or indium zinc oxide (IZO) film.

In the present example, the common electrode 14 is provided across the entire display area except the formation areas of the contact holes. In this case, a potential is supplied to the common electrode 14 from a metal interconnect connected to a Vcom terminal outside the display area, and thus the aperture ratio can be further enhanced. The common electrode 14 is so separated from the contact hole that a pixel electrode disposed in the contact hole as described later will be prevented from being short-circuited to the common electrode.

Figure 2B:
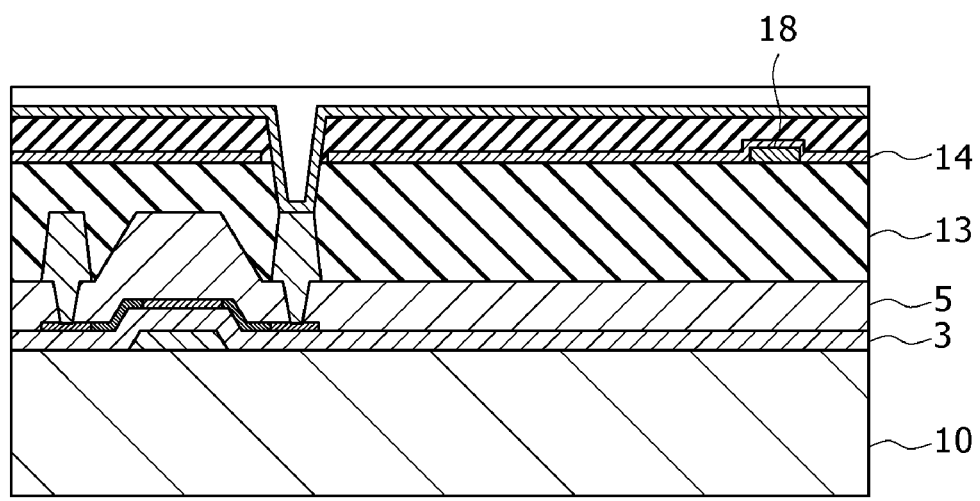

Although a potential is supplied to the common electrode 14 from a metal interconnect connected to a Vcom terminal outside the display area in the present embodiment, the structure shown in FIG. 2B is also available. Specifically, in this structure, plural common potential lines 18 composed of a material with a resistance value smaller than that of the common electrode 14 are disposed on the first insulating film 13 in parallel to the scan lines 11. The common potential lines 18 are connected to the common electrode 14. The common potential line 18 is formed by using e.g. any of Al, Mo, Ti, Pb, W, Cr, a composite layer of any of these metals (e.g., Ti/Al), and a metal compound layer (MoSi, AlSi). In the present example, the common potential line 18 is composed of e.g. Al, similarly to the scan line 11 and the signal line 12. However, the scan line 11, the signal line 12, and the common potential line 18 may be composed of different materials.

Figure 3A:
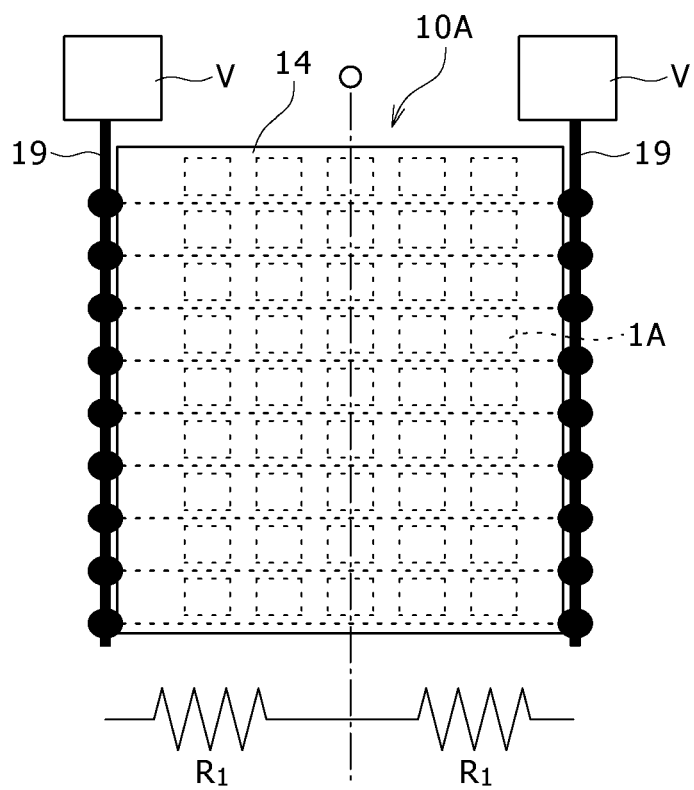
FIGS. 3A and 3B are schematic diagrams showing the case in which a common potential line is not disposed in the liquid crystal display device according to the embodiment of the present invention, and the case in which the common potential line is disposed, respectively.
Figure 3B:
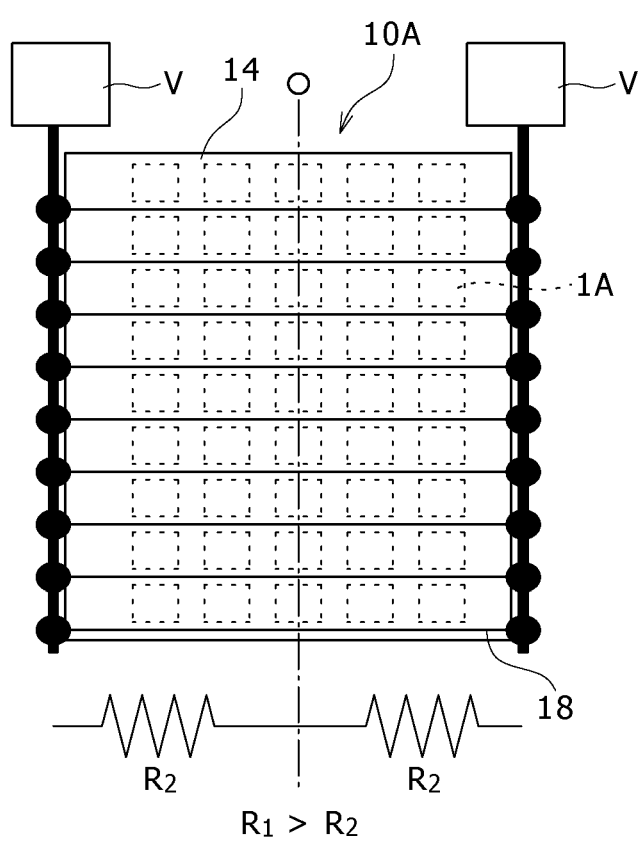

FIG. 3A is a schematic diagram showing the case in which the common potential lines are not disposed, and FIG. 3B is a schematic diagram showing the case in which the common potential lines are disposed. These drawings are used for comparison of the resistance value between these cases. In these examples of FIG. 3, metal interconnects 19 connected to Vcom terminals V are juxtaposed on both the sides of a display area 10A in which the pixel areas 1A are arranged, and a potential is supplied from these metal interconnects 19 to the common electrode 14 that is provided across the entire display area 10A except the contact holes. Thus, the potential is supplied from two metal interconnects 19 toward the center O of the display area 10A.

In the case of FIG. 3A, in which the common potential lines are not disposed and thus a potential is supplied from the metal interconnects 19 disposed outside the display area 10A directly to the common electrode 14 composed of ITO, the resistance $R_1$ of the common electrode 14 in the range from an end of the display area 10A to the center O is high because the resistance of ITO is 10 to 200 $\Omega/\square$. Consequently, time lags will arise in the potential supplied from an end of the display area 10A to the center O, which will cause luminance variation from place to place in the display area 10A of the liquid crystal panel. In contrast, in the case of FIG. 3B, in which the plural common potential lines 18 are disposed for each pixel row, the resistance $R_2$ of the common electrode 14 in the range from an end of the display area 10A to the center O is lower than the resistance $R_1$ because the metal material of the common potential lines 18 has lower resistance compared with ITO for the common electrode 14: for example, the resistances of Al and Mo are 0.05 $\Omega/\square$ and 0.5 $\Omega/\square$, respectively. Therefore, time lags in the potential supplied from an end of the display area 10A to the center O are prevented, which can suppress luminance variation from place to place in the display area 10A.

It is preferable that the common potential lines 18 overlap with the scan lines 11 or the signal lines 12 because such a structure allows the common potential lines 18 to be disposed without adversely affecting the aperture ratio.

Although two metal interconnects 19 are disposed on both the sides of the display area 10A in the examples of FIG. 3, another structure is also available in which one metal interconnect 19 is disposed on only one side of the display area 10A. However, it is preferable that two metal interconnects 19 be disposed on both the sides of the display area 10A because the resistance of the common electrode 14 in the range from an end of the display area 10A to the center thereof can be decreased.

Although the common potential line 18 is disposed between the first insulating film 13 and the common electrode 14 in the present example, the common potential line 18 may be disposed on any of the insulating layer 5, the gate insulating film 3, and the first substrate 10 as long as it is connected to the common electrode 14.

Referring again to FIG. 2A, on the common electrode 14, a second insulating film 15 that is formed of e.g. an inorganic insulating film such as a $SiO_2$ or SiN film deposited by CVD is provided. Using an inorganic insulating film deposited by CVD as the second insulating film 15 provides advantages of prevention of burn-in, yield enhancement, and so on. It is also possible that the second insulating film 15 be formed of an SOG film or organic insulating film instead of the inorganic insulating film. As the material of the organic insulating film, any of the same materials as those cited above for the first insulating film 13 can be used.

Combinations between the first insulating film 13 and the second insulating film 15 are shown in Table 2.

TABLE 2

|  | First insulating film | Second insulating film |
|---|---|---|
| System 1 | SOG | CVD-inorganic insulating film |
| System 2 | Organic insulating film | CVD-inorganic insulating film |
| System 3 | CVD-inorganic insulating film | CVD-inorganic insulating film |
| System 4 | SOG | SOG |
| System 5 | Organic insulating film | SOG |
| System 6 | CVD-inorganic insulating film | SOG |
| System 7 | SOG | Organic insulating film |
| System 8 | Organic insulating film | Organic insulating film |
| System 9 | CVD-inorganic insulating film | Organic insulating film |

Although various combinations between the first insulating film 13 and the second insulating film 15 will be available as shown in Table 2, the combinations of Systems 1 and 2 are preferable, in which an SOG film or organic insulating film is used as the first insulating film 13 and an inorganic insulating film deposited by CVD ("CVD-inorganic insulating film" in Table 2) is used as the second insulating film 15 as described above.

In the second insulating film 15 and the first insulating film 13, contact holes 15a and 13a that reach the drain electrode 6b are so provided as to communicate with each other, i.e., overlap with each other in plan view. On the second insulating film 15, a pixel electrode 16 is so provided as to be connected to the drain electrode 6b via the contact holes 15a and 13a.

Because the contact holes 15a and 13a overlap with each other in plan view, it is preferable that these holes be formed through one time of etching with use of one etching mask. Although the present embodiment can be applied also to the case in which the contact holes 15a and 13a do not overlap with each other in plan view, it is preferable that the holes overlap with each other because such a structure offers a higher aperture ratio.

An alignment layer 17 is disposed over the second insulating film 15 and covers the pixel electrode 16. As shown in FIG. 1B, this pixel electrode 16 has plural slits 16a provided in parallel to the signal lines 12.

When the plural slits 16a of the pixel electrode 16 are thus disposed in parallel to the signal lines 12, the effective pixel area is increased compared with the case in which the plural slits are disposed in parallel to the scan lines 11, like the related art described above with FIG. 14. This is due to the following reason.

Specifically, when the slits are in parallel to the scan lines 11, the area in the vicinity of the short sides of the slits, which are close to the signal lines 12, will not serve as the effective pixel area, because the alignment of liquid crystal molecules m is inhibited by the electrode portions that define these short sides. In contrast, when the slits 16a are disposed in parallel to the signal lines 12, the area including even the ends of the pixel electrode 16 on the signal line sides can be used as the effective pixel area. Also in this case, the area of the pixel electrode 16 in the vicinity of the short sides of the slits 16a will not serve as the effective pixel area. However, if this area is overlapped with the scan line 11, a high aperture ratio can be ensured favorably.

Figure 4:
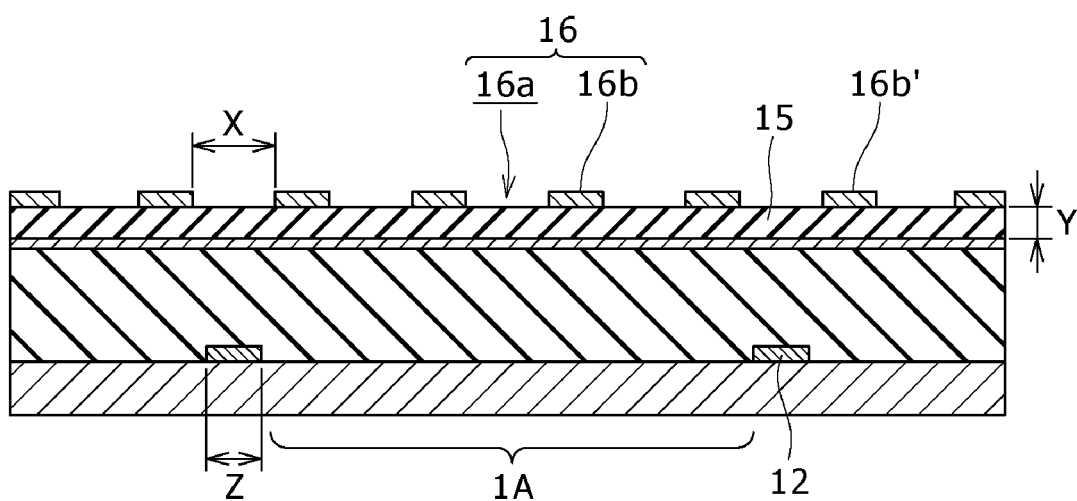
FIG. 4 is an enlarged sectional view along line B-B' in FIG. 1B, showing major part of the first substrate of the liquid crystal display device according to the embodiment of the present invention.

Referring to FIG. 4, which is the sectional view along line B-B' in FIG. 1B, the drive voltage for driving the pixel is defined by the width of the slit 16*a* in the center part of the pixel electrode 16, the width of an electrode portion 16*b* between the slits 16*a*, and the thickness of the second insulating film 15. If the distance X between the pixel electrodes 16 of adjacent pixels is too small, light leakage from the adjacent pixel will occur. Therefore, it is preferable to separate the pixel electrodes 16 from each other by a predetermined distance or more. For the control of the distance X between the pixel electrodes 16 of adjacent pixels, the width of an electrode portion 16*b*' existing between an end of the pixel electrode 16 on the signal line side and the slit 16*a* closest to the signal line 12 is so adjusted as to be different from the width of the electrode portions 16*b* other than this electrode portion 16*b*'.

FIG. 5 is a graph obtained by measuring light leakage from a white-displaying pixel B to a black-displaying pixel A that are adjacent to each other. The light leakage is plotted as the transmittance on the ordinate of the graph. The measurement was carried out with changes of the distance X between the pixel electrodes 16 of the pixels A and B to 2, 4, 6, 7, 8, 10, 12, 16, and 20 μm. As shown in this graph, it is proved that a smaller distance X between the pixel electrodes 16 of adjacent pixels causes a higher degree of light leakage. The signal line 12 composed of Al functions as a light-shielding body. Thus, the light leakage can be prevented by increasing the line width Z of the signal line 12.

A preferable width Z of the signal line 12 was studied by simulation. For this simulation, a transmittance of 0.1 or lower in the black-displaying pixel A was employed as the criterion of the state in which light leakage was not visually recognized in the pixel A. FIG. 6 is a graph showing the width Z of the signal line 12 providing a transmittance of 0.1 or lower of the black-displaying pixel A, obtained as the simulation results. In the graph, the distance X between the pixel electrodes 16 of the adjacent pixels is plotted on the abscissa. The simulation was carried out with changes of the thickness Y of the second insulating film 15 to 200, 400, 600, 800, and 1000 nm. As shown in this graph, it is found that the signal line width Z(y) is expressed by a linear function of which variable is the distance X(x) between the pixel electrodes 16 and the slope of the function is almost constant irrespective of the thickness of the second insulating film 15. Furthermore, it is found that the y-intercept of the function depends on the thickness of the second insulating film 15 and a larger thickness of the second insulating film 15 requires a larger width of the signal line serving as a light-shielding body.

Figure 7A:
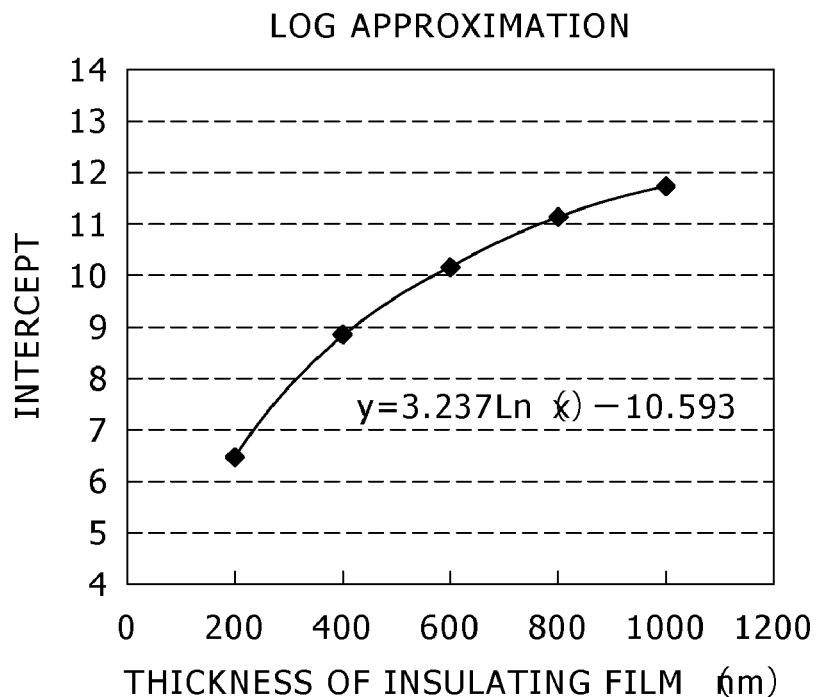
FIGS. 7A and 7B are graphs of a log approximation and a linear approximation, respectively, relating to a y-intercept that is a term of a linear function for expressing the signal line width in association with the distance between pixel electrodes as the variable, and depends on the film thickness of the second insulating film, according to the embodiment of the present invention.
Figure 7B:
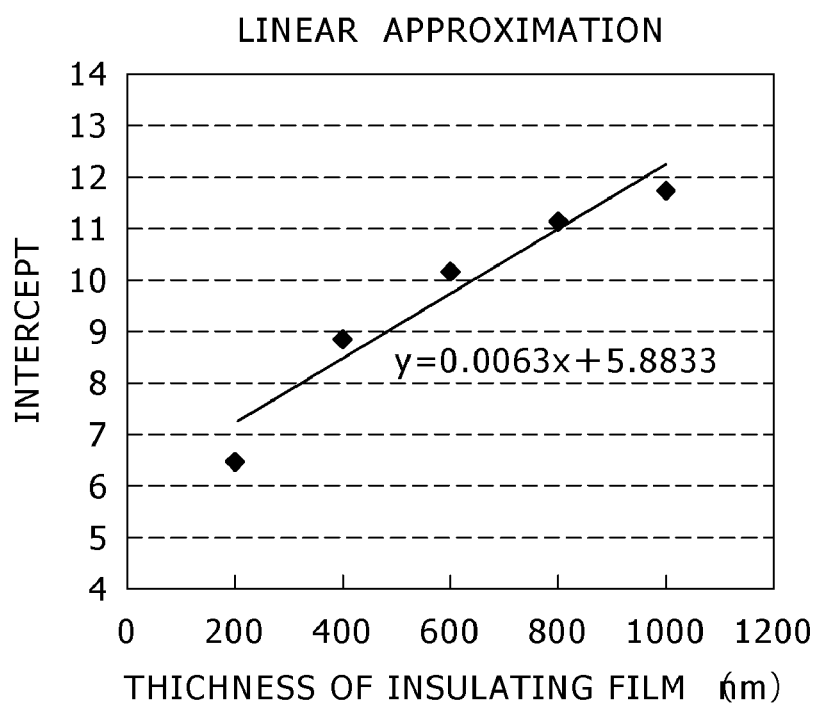

The expression of the linear function was generalized as follows. Specifically, as the slope of the generalized expression, the average of the slopes of five expressions as the simulation results obtained for the different thicknesses Y of the second insulating film 15 was employed. The intercept of the generalized expression was obtained by using an approximate equation. FIGS. 7A and 7B are graphs showing a log approximation and a linear approximation, respectively, for the intercept.

Based on the generalized expression, a preferable line width Z of the signal line 12 is expressed by Expression (1) when the log approximation is employed, and is expressed by Expression (2) when the linear approximation is employed.

$$Z \geq -0.92558X + 3.237 \ln(Y) - 10.593 \quad \text{Expression (1)}$$

$$Z \geq -0.92558X + 0.0063Y + 5.8833 \quad \text{Expression (2)}$$

The distance X between the pixel electrodes of adjacent pixels, the film thickness Y of the second insulating film, and the line width Z of the light-shielding body are so set that either of these two expressions is satisfied. In particular, when the respective values are set based on Expression (1) of the log approximation, which is the more accurate, light leakage can be surely suppressed.

Figure 8:
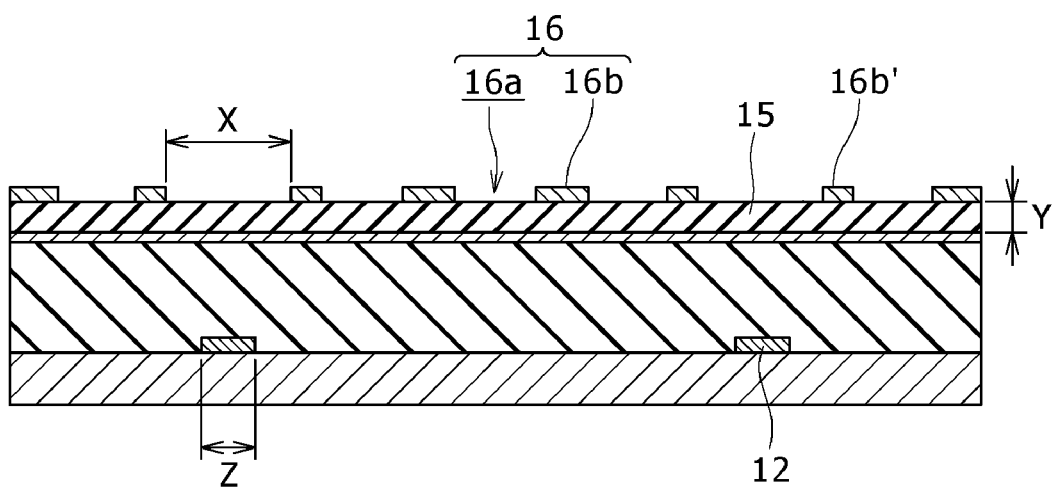
FIG. 8 is an enlarged sectional view along line B-B' in FIG. 1B, showing major part of the first substrate of the liquid crystal display device according to the embodiment of the present invention.

However, in the present embodiment, the function of the light-shielding body is implemented by the signal line 12, and the line width Z of the signal line 12 and the film thickness Y of the second insulating film 15 are defined based on the design of the liquid crystal display device. However, a smaller width Z provides a higher aperture ratio. Therefore, with the width Z set to the minimum value, the distance X between the pixel electrodes of adjacent pixels is so set that Expression (1) or Expression (2) is satisfied. Furthermore, as shown in FIG. 8, the width of the electrode portions 16*b*' of the pixel electrode 16 closest to the signal lines 12 is set smaller than that of the other electrode portions 16*b*, to thereby adjust the distance X between the pixel electrodes of the adjacent pixels.

Although the signal line 12 serves also as a light-shielding body in the present embodiment, a light-shielding body that is not electrically connected to any electrode may be disposed under the signal line 12.

Referring again to FIG. 1, the operation of the liquid crystal display device 100 will be described below. When no electric field is applied, the liquid crystal molecules m in the liquid crystal layer 30 are so aligned as to yield no phase difference. Therefore, light h that is emitted from a backlight and has passed through the polarizer 40 is absorbed by the polarizer 50, which is disposed in a crossed-Nicols state with respect to the polarizer 40, so that black is displayed.

On the other hand, when an electric filed is applied, the liquid crystal molecules m are so aligned that a phase difference of λ/2 will arise due to the passage of light through the liquid crystal layer 30. Thus, as a result of the passage through the liquid crystal layer 30, the light h that is emitted from the backlight and has passed through the polarizer 40 is turned to 90°-rotated linearly-polarized light arising from a phase difference of λ/2. Therefore, the light passes through the polarizer 50, so that white is displayed.

Figure 9:
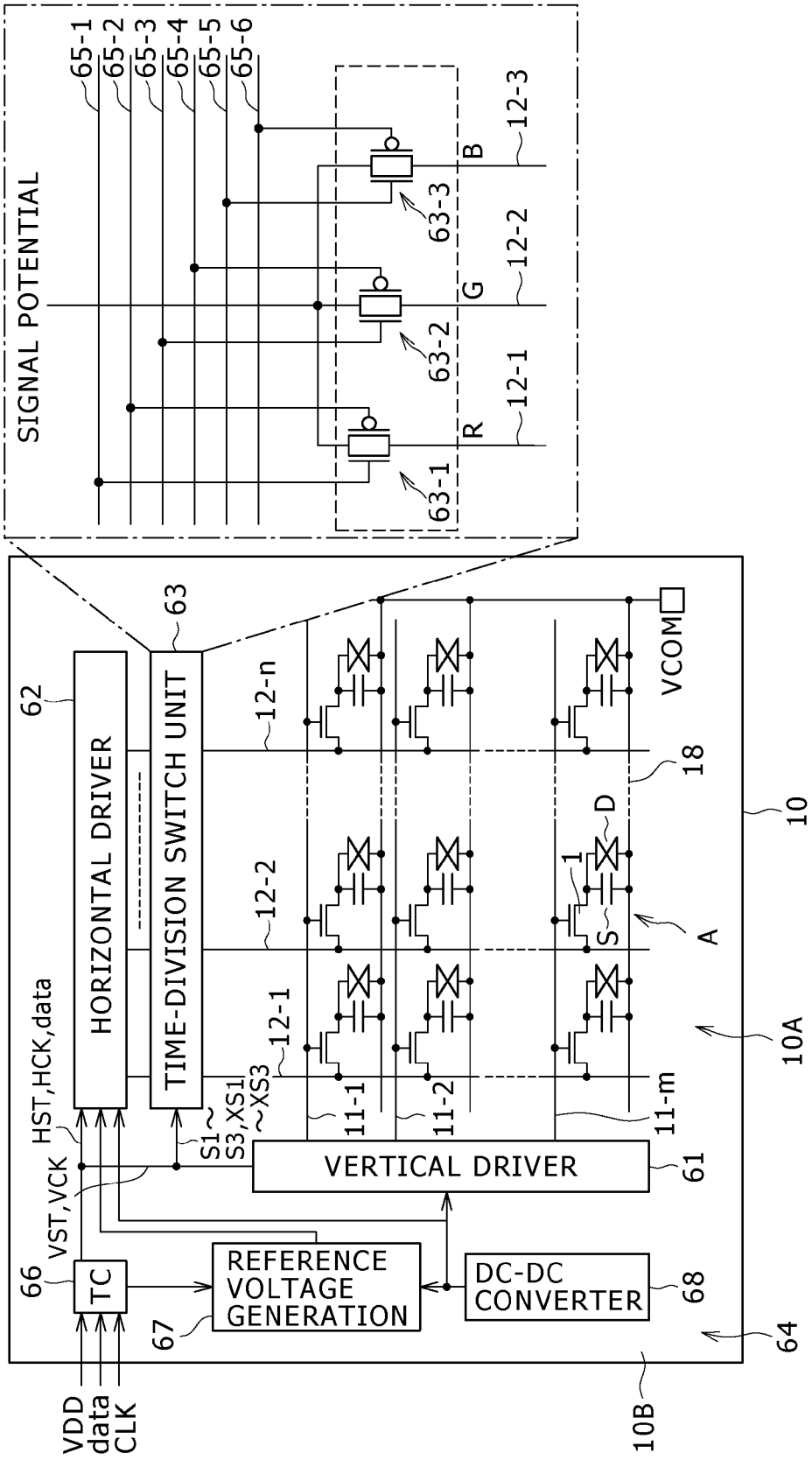
FIG. 9 is a circuit diagram according to the embodiment of the present invention.

FIG. 9 is a circuit diagram of the liquid crystal display device 100. On the first substrate 10 of this liquid crystal display device 100, the display area 10A and a peripheral area 10B are defined. This circuit diagram corresponds to the case in which the metal interconnect 19 for supplying a potential is disposed only in the peripheral area 10B of one side outside the display area 10A as described above with FIGS. 3A and 3B.

The display area 10A is formed as a pixel array part in which the plural scan lines 11 and the plural signal lines 12 are arranged in a matrix and one pixel A is provided at each of the intersections between the scan lines 11 and the signal lines 12.

Furthermore, the following units are mounted in the peripheral area 10B: a vertical driver 61 that sequentially selects the respective pixels A in the display area 10A on a row-by-row basis; a horizontal driver 62 that writes pixel signals to the respective pixels A selected on the row-by-row basis; time-division switch units 63 for time-division driving; and a control system 64 that controls the vertical and horizontal drivers 61 and 62 and the time-division switch units 63.

Each of the pixels A includes the TFT 1, a display element D, and an auxiliary capacitor S. The gate electrode of the TFT 1 is connected to one of the scan lines 11-1 to 11-*m*, and the source electrode 6*a* of the TFT 1 is connected to one of the signal lines 12-1 to 12-*n*. The pixel electrode 16 of the display element D is connected to the drain electrode 6*b* of the TFT 1. One electrode of the auxiliary capacitor S is connected to the drain electrode 6*b* of the TFT 1. In each of the pixels A having such a configuration, the common electrode of the display element D and the other electrode of the auxiliary capacitor S are connected to the common potential line 18. To the common potential line 18, a predetermined DC voltage or rectangular-waveform voltage in sync with a horizontal synchronizing signal is supplied as a common potential VCOM.

This liquid crystal display device 100 is driven by a time-division driving method. In the time-division driving method, the display area 10A is divided in such a way that the plural signal lines 12 adjacent to each other are treated as one unit (block), and signal voltages that are to be supplied to the plural signal lines 12 in one division block are output from a respective one of output terminals of the horizontal driver 62 in a time-series manner. In addition, the time-division switch unit 63 is provided for the plural signal lines 12 as one unit, and the time-series signal voltages output from the horizontal driver 62 are sampled in a time-division manner by the time-division switch unit 63, followed by being sequentially supplied to the plural signal lines.

The time-division switch unit 63 is formed of analog switches (transmission switches) for sampling in a time-division manner the time-series signal voltages output from the horizontal driver 62. A specific configuration example of the time-division switch unit 63 will be described below. One time-division switch unit 63 is provided for a respective one of the outputs of the horizontal driver 62. This example corresponds to the case in which tripartite-time-division driving is carried out for three colors of red (R), green (G), and blue (B).

This time-division switch unit 63 is formed of analog switches 63-1, 63-2, and 63-3 each having a CMOS configuration obtained by connecting a PchMOS transistor and an NchMOS transistor in parallel. Although switches having a CMOS configuration are employed as the analog switches 63-1, 63-2, and 63-3 in the present example, it is also possible to use switches having a PMOS or NMOS configuration.

In this time-division switch unit 63, the respective input terminals of three analog switches 63-1, 63-2, and 63-3 are connected in common, and each of the output terminals thereof is connected to a respective one of ends of three signal lines 12-1, 12-2, and 12-3. To the respective input terminals of these analog switches 63-1, 63-2, and 63-3, signal potentials that are output from the horizontal driver 62 in a time-series manner are supplied.

If the common electrode 14 of the present embodiment is disposed also above the analog switches 63-1, 63-2, and 63-3, the analog switches 63-1, 63-2, and 63-3 that are each formed of the TFT 1 having a bottom-gate structure can eliminate the influence of potential variation due to parasitic capacitance from a vicinity gate selection signal and each of the neighboring signal lines 12-1, 12-2, and 12-3. It is apparent that the same advantage is obtained also when the analog switches 63-1, 63-2, and 63-3 are formed to have a top-gate structure.

Two control lines are connected to one analog switch; total six control lines 65-1 to 65-6 are provided. Two control input terminals of the analog switch 63-1 (i.e., the respective gates of the CMOS transistors) are connected to the control lines 65-1 and 65-2. Two control input terminals of the analog switch 63-2 are connected to the control lines 65-3 and 65-4. Two control input terminals of the analog switch 63-3 are connected to the control lines 65-5 and 65-6.

To six control lines 65-1 to 65-6, gate selection signals S1 to S3 and XS1 to XS3 for sequentially selecting three analog switches 63-1, 63-2, and 63-3 are supplied from a timing controller (TC) 66 to be described later. The gate selection signals XS1 to XS3 are the inverted signals of the gate selection signals S1 to S3.

The gate selection signals S1 to S3 and XS1 to XS3 sequentially turn on three analog switches 63-1, 63-2, and 63-3 in synchronization with the time-series signal potentials output from the horizontal driver 62. Thus, the analog switches 63-1, 63-2, and 63-3 sample the time-series signal potentials output from the horizontal driver 62 in a tripartite-time-division manner in a 1 H period, and then supply the signal potentials to the corresponding signal lines 12-1, 12-2, and 12-3, respectively.

The control system 64 that controls the vertical driver 61, the horizontal driver 62, and the time-division switch units 63 includes the timing controller (TC) 66, a reference voltage generation source 67, a DC-DC converter 68, and so on. These circuits are mounted in the peripheral area 10B on the first substrate together with the vertical driver 61, the horizontal driver 62, and the time-division switch units 63.

To the timing controller 66 in this control system 64, a supply voltage VDD from an external power supply unit (not shown), digital image data from an external CPU (not shown), and a clock CLK from an external clock generator (not shown) are input via a TCP (not shown).

Figure 10:
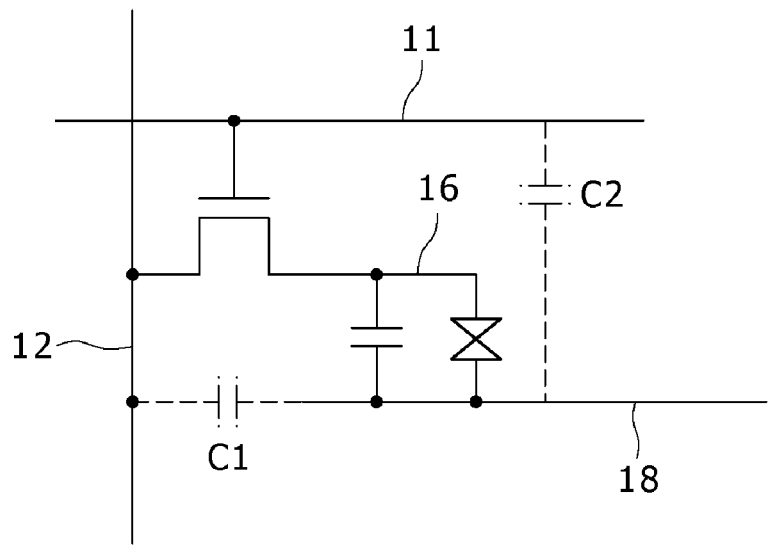
FIG. 10 is a circuit diagram of one pixel according to the embodiment of the present invention.

FIG. 10 is a circuit diagram of each pixel A in the liquid crystal display device of the present embodiment. As shown in FIG. 10, due to the provision of the common electrode 14 across the entire display area 10A except the contact hole formation areas, parasitic capacitances C1 and C2 that arise between the signal line 12 and the pixel electrode 16 and between the scan line 11 and the pixel electrode 16, respectively, are coupled to the common electrode 14, so that the influence on the pixel potential is suppressed.

In such a liquid crystal display device and display apparatus including it, the common electrode 14 is so disposed on the first insulating film 13 as to cover not only the pixel area 1A except the formation area of the contact holes 13a and 15a but also at least one of the scan line 11 and the signal line 12. This feature can increase the effective pixel area and can enhance the aperture ratio. Consequently, the light transmittance is enhanced and contrast can be enhanced.

Furthermore, due to the provision of the common electrode 14 covering at least one of the scan line 11 and the signal line 12, parasitic capacitance between the signal line 12 and the pixel electrode 16 or between the scan line 11 and the pixel electrode 16 is suppressed. In particular, in the liquid crystal display device of the present embodiment, the entire display area 10A except the formation areas of the contact holes 13a and 15a is covered by the common electrode 14. This feature can surely prevent signal noise in the pixels. Therefore, the held pixel potential is stabilized and neither vertical crosstalk nor horizontal crosstalk will occur, which enhances the image quality of the liquid crystal display device.

In addition, the liquid crystal display device of the present embodiment and display apparatus including it are free from generation of a back-channel in the semiconductor layer 4 of the bottom-gate TFT 1, which employs a-Si, poly-Si, or single-crystal silicon for the semiconductor layer 4, due to an electric field from the signal line 11, the scan line 12, and the pixel electrode 16. Thus, unstable operation due to a parasitic back-channel is prevented. It is apparent that the same advantage is offered also to a top-gate TFT.

Figure 11:
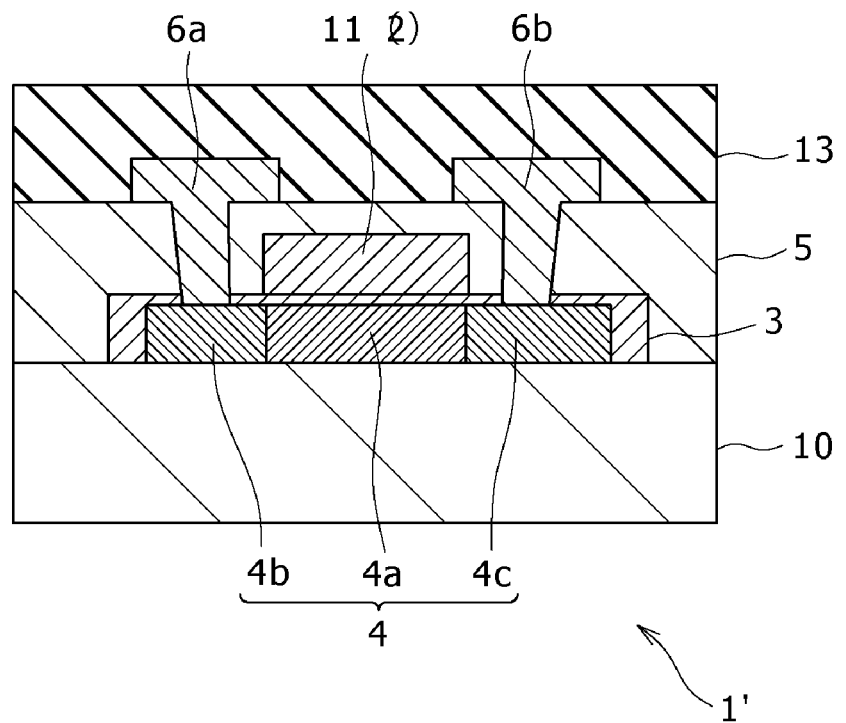
FIG. 11 is a structural diagram showing another transistor according to the embodiment of the present invention.

When the TFT 1 is a top-gate transistor, as shown in FIG. 11, the semiconductor layer 4 composed of a-Si, poly-Si, or single-crystal silicon is pattern-formed on the first substrate 10. Over this semiconductor layer 4, the scan line 11 that is extended along one direction and has a partial portion serving as the gate electrode 2 is pattern-formed with the intermediary of the gate insulating film 3. In this case, an n-type impurity is ion-implanted with use of the gate electrode 2 as the implantation mask. Thus, the semiconductor layer 4 directly beneath the gate electrode 2 serves as the channel layer 4a, and the semiconductor layer 4 on both the sides of the channel layer 4a serve as the source region 4b and the drain region 4c. Furthermore, the insulating layer 5 is provided on the gate electrode 2 and the gate insulating film 3, and the source and drain regions 4b and 4c are connected to the source and drain electrodes 6a and 6b via contact holes 5a and 5b provided in the insulating layer 5. Moreover, the first insulating film 13 is provided to cover the source and drain electrodes 6a and 6b.

MODIFICATION EXAMPLE 1

Figure 12:
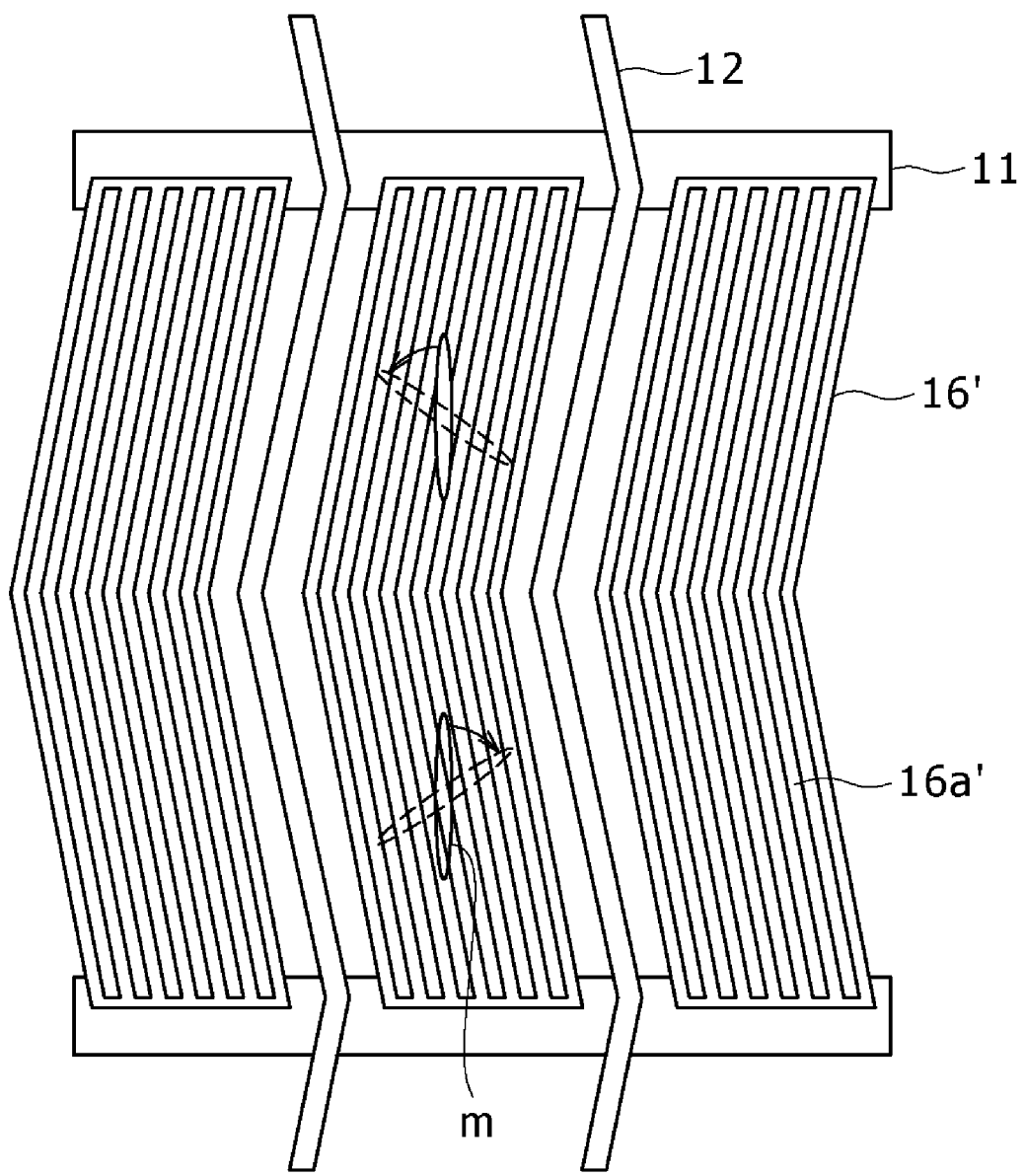
FIG. 12 is a plan view showing Modification example 1 of the embodiment of the present invention.

In the above-described first embodiment, the pixel electrode 16 has a rectangular shape and the rectangular slits 16a are provided as an example. Alternatively, a multi-domain structure like that shown in the plan view of FIG. 12 may be used. Specifically, in the structure of FIG. 12, a pixel electrode 16' has a shape obtained by bending a rectangular electrode around the center of its longitudinal sides in plan view, i.e., a shape obtained by bending a rectangular electrode into a "V-character shape". In this case, slits 16a' of the pixel electrode 16' are also opened into a "V-character shape" in matching with the outer shape of the pixel electrode 16'. In this structure, two domains having different electric-field directions exist in the pixel area 1A. Therefore, the number of alignment directions of the liquid crystal molecules m in the pixel area 1A is also two, which can greatly improve the viewing-angle characteristic. In the structure of FIG. 12, the signal lines 12 are disposed into a zigzag shape in matching with the bending of the pixel electrode 16'.

The specific shape of the slits 16a' opened into a "V-character shape" is designed as follows. Specifically, if the alignment direction of the longitudinal axis of the liquid crystal molecules m when an electric field is applied is set to 90° in the above-described two domains having different electric-field directions, the angle of the longitudinal direction of the slits 16a' with respect to the longitudinal axis of the liquid crystal molecules m is set equal to or larger than 45° and smaller than 90°, and preferably set to equal to or larger than 65° and equal to or smaller than 89°.

MODIFICATION EXAMPLE 2

Figure 13:
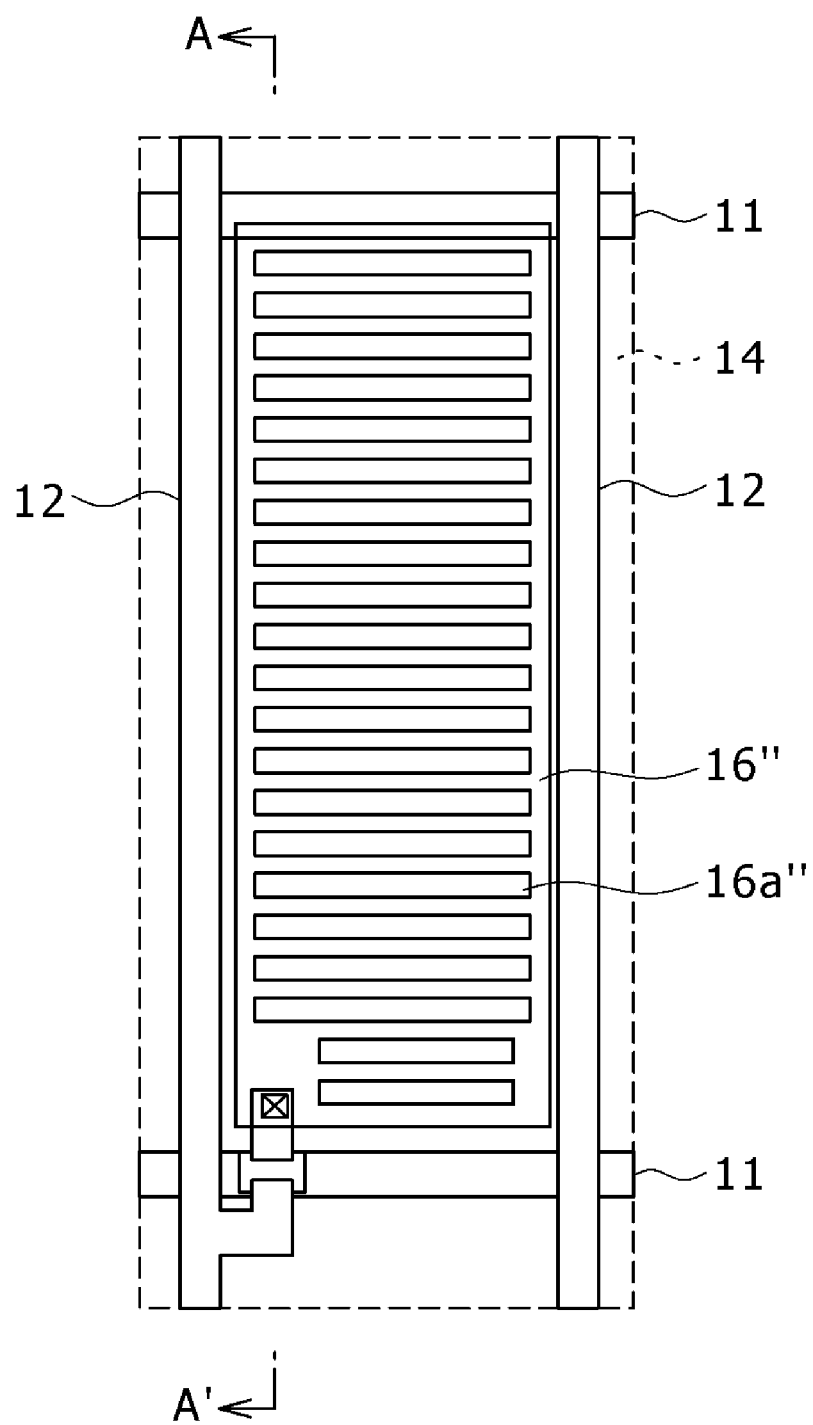
FIG. 13 is a plan view showing Modification example 2 of the embodiment of the present invention.

As shown in the plan view of FIG. 13, plural slits 16a" of a pixel electrode 16" may be disposed in substantially parallel to the scan lines 11. The "substantially parallel" means that the slits 16a" have an inclination in the range of 0° to about 45° with respect to the scan lines 11. Also in this structure, due to the provision of the common electrode 14 across the entire display area 10A except the formation areas of the contact holes 13a and 15a, the aperture ratio is enhanced and parasitic capacitances between the signal line 12 and the pixel electrode 16" and between the scan line 11 and the pixel electrode 16" are suppressed. However, as described above for the first embodiment, it is preferable that the slits 16a of the pixel electrode 16 be disposed in parallel to the signal lines 12 because a higher aperture ratio is achieved.

Even in such a liquid crystal display device, the light transmittance is enhanced and contrast can be enhanced due to the increase in the aperture ratio. Furthermore, because parasitic capacitance between the scan line and the pixel electrode or between the signal line and the pixel electrode is suppressed, signal noise in the pixels can be prevented. Thus, the held pixel potential is stabilized and neither vertical crosstalk nor horizontal crosstalk will occur, which can enhance the image quality of the liquid crystal display device.

Also for the structure of Modification example 2, a common potential line connected to the common electrode 14 may be disposed as described above with FIG. 2B. In addition, the multi-domain structure described for Modification example 1 may be applied.

The above-described embodiment and modification examples are applied to a transmissive liquid crystal display device as an example. However, embodiments of the present invention are not limited thereto but can be applied also to a FFS-mode liquid crystal display device of a reflective type or semi-transparent type having a reflective area and a transmissive area.

Embodiments

Specific embodiments of the embodiment will be described in detail below.

Embodiment 1

A liquid crystal display device was manufactured in which, similarly to the structure described with FIG. 1 for the first embodiment, the common electrode 14 was disposed across the entire display area except the contact hole formation areas on the first insulating film 13 and plural slits of the pixel electrode 16 were disposed in parallel to the signal lines 12.

Embodiment 2

A liquid crystal display device was manufactured in which, similarly to the structure described with FIG. 13 for Modification example 2, the common electrode 14 was disposed across the entire display area except the contact hole formation areas on the first insulating film 13 and the plural slits 16a" of the pixel electrode 16" were disposed in parallel to the scan lines 11.

COMPARATIVE EXAMPLE 1

Figure 14A:
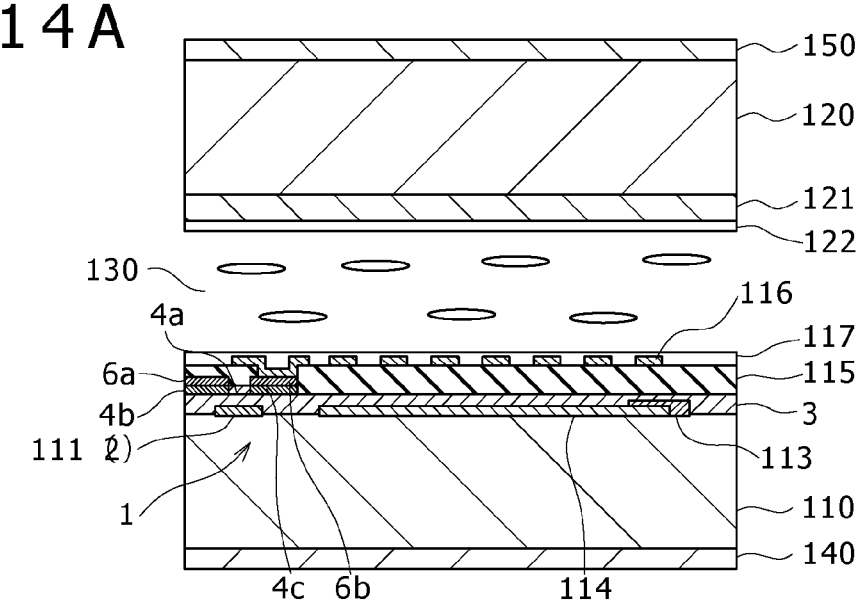
FIGS. 14A and 14B are a sectional view and a plan view, respectively, for explaining the structure of a related-art liquid crystal display device.
Figure 14B:
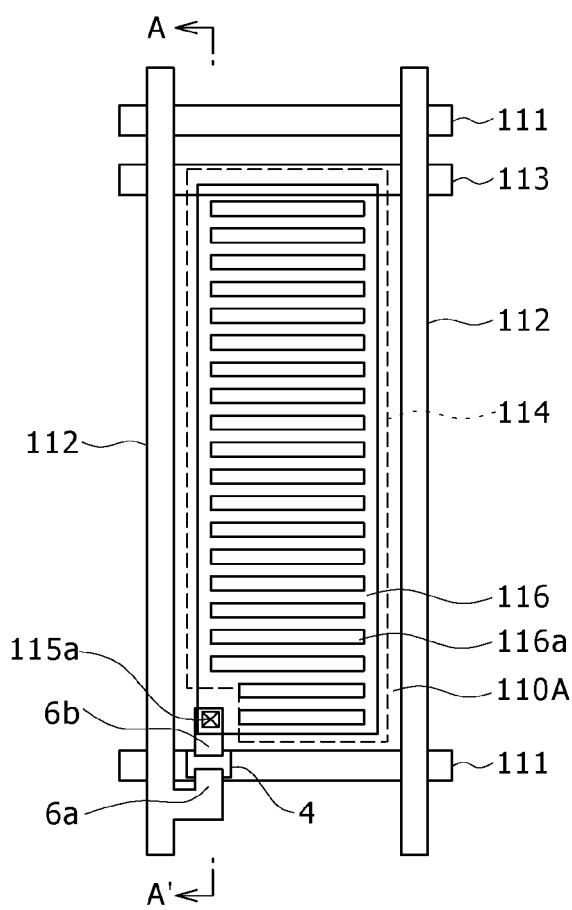
Figure 15A:
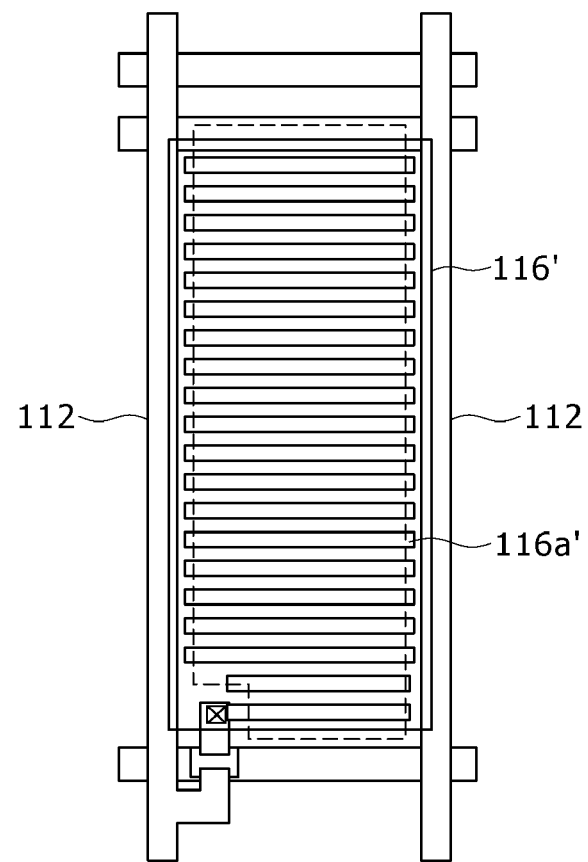
FIGS. 15A and 15B are a plan view and a circuit diagram, respectively, showing a problem of a related-art liquid crystal display device.
Figure 15B:
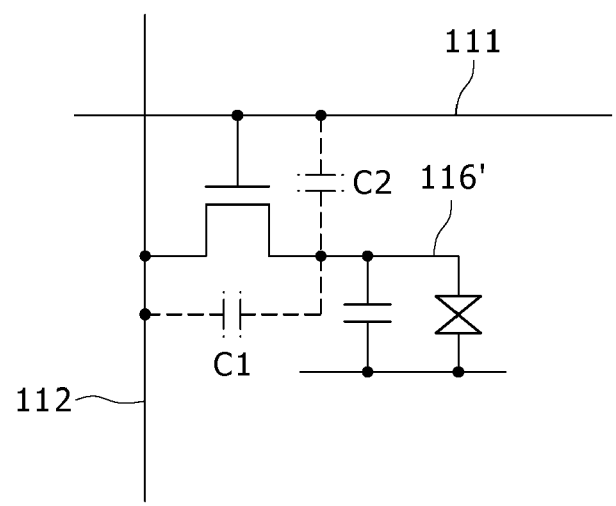

As a comparative example for Embodiments 1 and 2, a liquid crystal display device was manufactured in which, similarly to the structure described with FIG. 14 for a related art, the common electrode 114 was disposed in the pixel area except the formation area of the TFT 1 on the first substrate 110 and the plural slits 116a of the pixel electrode 116 were disposed in parallel to the scan lines 111.

The aperture ratios and the relative transmittances of the liquid crystal display devices of Embodiments 1 and 2 and Comparative example 1 were measured and compared with each other. The relative transmittance indicates the ratio of extracted light when the ratio of incident light is defined as 100%, and is in proportion to the aperture ratio. The measurement results are shown in Table 3.

TABLE 3

|  | Aperture ratio (%) | Relative transmittance (%) |
| --- | --- | --- |
| Embodiment 1 | 132 | 7.0 |
| Embodiment 2 | 120 | 6.4 |
| Comparative example 1 | 100 | 5.3 |

As shown in Table 3, it was confirmed that the aperture ratios of the liquid crystal display devices of Embodiments 1 and 2 were higher than that of the liquid crystal display device of Comparative example 1: the aperture ratios of Working examples 1 and 2 were 132% and 120%, respectively, when the aperture ratio of Comparative example 1 was defined as 100%. Furthermore, the relative transmittance of Comparative example 1 was 5.3%, whereas the relative transmittances of Embodiments 1 and 2 were 7.0% and 6.4%, respectively. Thus, it was confirmed that the relative transmittance was also increased in linkage with the increase in the aperture ratio.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device that includes a liquid crystal layer interposed between a first substrate and a second substrate and has on a first substrate side a common electrode and a pixel electrode for applying an electric field to the liquid crystal layer, the liquid crystal display device comprising:
   a plurality of scan lines and a plurality of signal lines configured to be disposed in a matrix over the first substrate;
   a drive element configured to be disposed at an intersection between the scan line and the signal line;
   a first insulating film configured to be provided over the first substrate and cover the drive element;
   a common electrode configured to be disposed on the first insulating film;
   a second insulating film configured to be disposed over the first insulating film and cover the common electrode; and
   a pixel electrode configured to be disposed on the second insulating film in a pixel area and have a plurality of slits, the pixel electrode being connected to the drive element via a contact hole provided in the second insulating film and the first insulating film,
   wherein
      the common electrode covers the pixel area except a formation area of the contact hole on the first insulating film and at least one of the scan line and the signal line, and
      the pixel electrode is so configured that a width of an electrode portion between an end of the pixel electrode on a signal line side and a slit closest to the signal line is different from a width of an electrode portion between other slits.

2. The liquid crystal display device according to claim 1, wherein the common electrode is provided across an entire display area except the formation area of the contact hole on the first insulating film.

3. The liquid crystal display device according to claim 1, wherein the first insulating film is formed of a spin-on-glass film or an organic insulating film.

4. The liquid crystal display device according to claim 1, wherein
   the common electrode is connected to a common potential line that is composed of a material having a resistance value lower than a resistance value of the common electrode, and
   the common potential line overlaps with the signal line or the scan line in plan view.

5. The liquid crystal display device according to claim 1, wherein the plurality of slits of the pixel electrode are provided in parallel to the signal line.

6. The liquid crystal display device according to claim 1, further comprising:
   a gate insulating film formed on the first substrate; and
   an insulating layer formed on a portion of the drive element, the insulating layer being between the gate insulating film and the first insulating film.

7. A liquid crystal display device that includes a liquid crystal layer interposed between a first substrate and a second substrate and has on a first substrate side a common electrode and a pixel electrode for applying an electric field to the liquid crystal layer, the liquid crystal display device comprising:
   a plurality of scan lines and a plurality of signal lines configured to be disposed in a matrix over the first substrate;
   a drive element configured to be disposed at an intersection between the scan line and the signal line;
   a first insulating film configured to be provided over the first substrate and cover the drive element;
   a common electrode configured to be disposed on the first insulating film;
   a second insulating film configured to be disposed over the first insulating film and cover the common electrode; and
   a pixel electrode configured to be disposed on the second insulating film in a pixel area and have a plurality of slits, the pixel electrode being connected to the drive element via a contact hole provided in the second insulating film and the first insulating film,
   wherein
      the common electrode, being formed only of a single electrode material, covers substantially the entire pixel area in a continuous manner except for a formation area of the contact hole on the first insulating film and at least one of the scan line and the signal line, and
      the pixel electrode is so configured that a width of an electrode portion between an end of the pixel electrode on a signal line side and a slit closest to the signal line is different from a width of an electrode portion between other slits.

8. A display apparatus including a liquid crystal display device that includes a liquid crystal layer interposed between a first substrate and a second substrate and has on a first substrate side a common electrode and a pixel electrode for applying an electric field to the liquid crystal layer, the display apparatus displaying video by using light modulated by the liquid crystal display device, the display apparatus comprising:
   a plurality of scan lines and a plurality of signal lines configured to be disposed in a matrix over the first substrate;
   a drive element configured to be disposed at an intersection between the scan line and the signal line;
   a first insulating film configured to be provided over the first substrate and cover the drive element;
   a common electrode configured to be disposed on the first insulating film;
   a second insulating film configured to be disposed over the first insulating film and cover the common electrode; and
   a pixel electrode configured to be disposed on the second insulating film in a pixel area and have a plurality of slits, the pixel electrode being connected to the drive element via a contact hole provided in the second insulating film and the first insulating film,
   wherein
      the common electrode covers the pixel area except a formation area of the contact hole on the first insulating film and at least one of the scan line and the signal line, and
      the pixel electrode is so configured that a width of an electrode portion between an end of the pixel electrode on a signal line side and a slit closest to the signal line is different from a width of an electrode portion between other slits.

* * * * *